US007284059B2

(12) United States Patent
Isozu

(10) Patent No.: US 7,284,059 B2
(45) Date of Patent: Oct. 16, 2007

(54) TERMINAL DEVICE, DATA TRANSMISSION-RECEPTION SYSTEM AND DATA TRANSMISSION-RECEPTION INITIATION METHOD

(75) Inventor: Masaaki Isozu, Tokyo (JP)

(73) Assignee: Sony Corporation, Tokyo (JP)

( * ) Notice: Subject to any disclaimer, the term of this patent is extended or adjusted under 35 U.S.C. 154(b) by 855 days.

(21) Appl. No.: 10/414,614

(22) Filed: Apr. 16, 2003

(65) Prior Publication Data

US 2004/0015589 A1    Jan. 22, 2004

(30) Foreign Application Priority Data

Apr. 17, 2002  (JP) ............... 2002-115349

(51) Int. Cl.
*G06F 15/16* (2006.01)
(52) U.S. Cl. ............... 709/227; 709/232; 370/338
(58) Field of Classification Search ............... 709/205, 709/208, 218, 224, 227, 229, 232, 238; 370/338; 714/39
See application file for complete search history.

(56) References Cited

U.S. PATENT DOCUMENTS

| 5,771,354 | A  | * | 6/1998  | Crawford ............... 709/229 |
| 6,735,630 | B1 | * | 5/2004  | Gelvin et al. ............ 709/224 |
| 6,779,004 | B1 | * | 8/2004  | Zintel .................... 709/227 |
| 6,873,849 | B2 | * | 3/2005  | da la Red et al. ........ 455/445 |
| 6,904,035 | B2 | * | 6/2005  | Requena ................. 370/338 |
| 6,910,074 | B1 | * | 6/2005  | Amin et al. ............. 709/227 |
| 6,931,574 | B1 | * | 8/2005  | Coupal et al. ........... 714/39 |
| 7,035,923 | B1 | * | 4/2006  | Yoakum et al. .......... 709/224 |
| 7,054,949 | B2 | * | 5/2006  | Jennings ................. 709/238 |
| 7,085,814 | B1 | * | 8/2006  | Gandhi et al. ........... 709/208 |
| 2002/0032751 | A1 | * | 3/2002  | Bharadwaj .............. 709/218 |
| 2002/0124100 | A1 | * | 9/2002  | Adams .................. 709/232 |
| 2003/0032432 | A1 | * | 2/2003  | Red et al. ............... 455/445 |
| 2003/0037113 | A1 | * | 2/2003  | Petrovykh .............. 709/205 |
| 2003/0188319 | A1 | * | 10/2003 | Weissman .............. 725/106 |
| 2004/0213286 | A1 | * | 10/2004 | Jette et al. .............. 370/466 |
| 2006/0095575 | A1 | * | 5/2006  | Sureka et al. ........... 709/227 |

OTHER PUBLICATIONS

Performance optimization of VoIP calls over wireless links using H.323 protocol Das, S.K.; Lee, E.; Basu, K.; Kakani, N.; Sen, S.K.; INFOCOM 2002. Twenty-First Annual Joint Conference of the IEEE Computer and Communications Societies. Proceedings. IEEE vol. 3, Jun. 23-27, 2002 pp. 1386-1394 vol. 3.*
TeleMIP: Telecommunications-Enhanced Mobile IP . . . - Das, al. (2000) ntrg.cs.tcd.ie/htewari/papers/das.pdf.*
Signaling for Internet Telephony—Schulzrinne, Rosenberg (1998) www.cs.columbia.edu/~hgs/papers/Schu9810_Signaling.pdf.*

* cited by examiner

*Primary Examiner*—Thong Vu
(74) *Attorney, Agent, or Firm*—Finnegan, Henderson, Farabow, Garrett & Dunner, L.L.P.

(57) ABSTRACT

A terminal device includes: a session initiation request message generating section for generating a message for starting a session with an external device and in which capability information on the terminal device is described; a capability information analyzing section for analyzing capability information on the external device described in a response message transmitted from the external device; a communication mode determining section for determining a communication mode between the terminal device and the external device based on an analysis result by the capability information analyzing section and the capability information on the terminal device; and a control section for, based on the determined communication mode, controlling a data conversion device connected to the network such that data from the terminal device is converted into data receivable by the external device, and such that data from the external device is converted into data receivable by the terminal device.

17 Claims, 9 Drawing Sheets

FIG.3

SIP:
```
INVITE sip:isozu@sm.sony.co.jp SIP/2.0
Via:SIP/2.0/UDP 43.11.135.26
From:correspondent <sip:or@jp.sony.com>
To:Masaaki Isozu <sip:sipsozu@sm.sony.co.jp>
Call-ID:10905491118@43.11.135.26
CSeq:1 INVITE
Content-type:application/scl
```

SCL:
```
<?xml version="1.0"?>
<terminal name="VAIO-C1" id="3ffe:505:d:7000::1"/>     #TERMINAL NAME AND ID
  <software>
    <application name="Visualphone">                    #APPLICATION NAME
      <port no="573"/>                                  #PORT NUMBER TO BE USED
      <sendmedia type="Video">                          #MEDIA TYPE FOR TRANSMISSION
        <format type="bitmap"/>                         #TRANSMISSION FORMAT
        <color depth="16"/>                             #NUMBER OF COLORS IN THE TRANSMISSION FORMAT
        <resolution width="640" height="480"/>          #TRANSMISSION FORMAT RESOLUTION
      </sendmedia>
      <recvmedia type="Video">                          #MEDIA TYPE FOR RECEPTION
        <format type="MP2T"/>                           #RECEPTION FORMAT
        <color depth="24"/>                             #NUMBER OF COLORS IN THE RECEPTION FORMAT
        <resolution width="320" height="160"/>          #RECEPTION FORMAT RESOLUTION
      </recvmedia>
    </application>
  </software>
</terminal>
<mediaconverter name="Callers" id="3ffe:505:7100::1"/>  #MEDIA CONVERTER NAME AND ID
  <convert id="1" type="size smaller">                  #CONVERSION ID AND CONVERSION TYPE
    <inputmedia type="movie">                           #INPUT MEDIA TYPE
      <format type="mpeg"/>                             #INPUT FORMAT
      <color depth="16"/>                               #NUMBER OF COLORS OF INPUT
      <resolution width="640" height="480"/>            #INPUT RESOLUTION
    </format>
    </inputmedia>
    <outputmedia type="movie">                          #OUTPUT MEDIA TYPE
      <format type="bitmap"/>                           #OUTPUT FORMAT
      <color depth="8"/>                                #NUMBER OF COLORS OF OUTPUT
      <resolution width="320" height="160"/>            #OUTPUT RESOLUTION
    </format>
    </outputmedia>
  </convert>
</mediaconverter>
</xml>
```

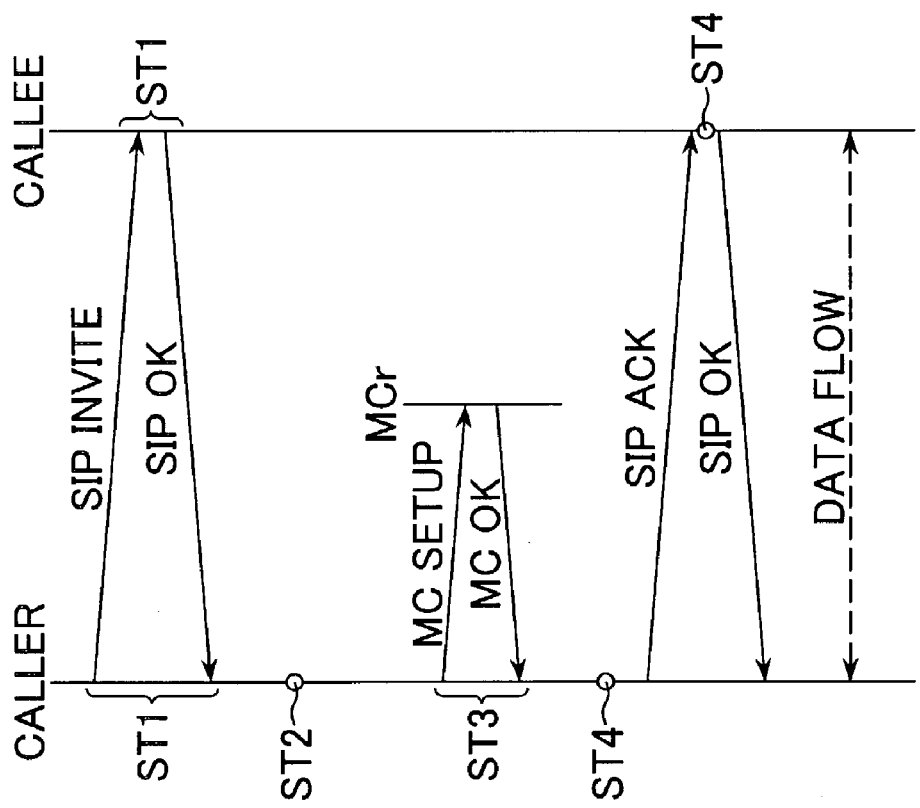

TERMINAL DEVICE, DATA TRANSMISSION-RECEPTION SYSTEM AND DATA TRANSMISSION-RECEPTION INITIATION METHOD

CROSS REFERENCE TO RELATED APPLICATIONS

The present document claims priority to Japanese Priority Document JP 2002-115349, filed in the Japanese Patent Office on Apr. 17, 2002, the entire contents of which are incorporated herein by reference to the extent permitted by law.

BACKGROUND OF THE INVENTION

1. Field of the Invention

The present invention generally relates to network negotiations executed at the beginning of a two-way session, and more particularly to a terminal device, a data transmission-reception system and a data transmission-reception initiation method, in all of which the optimum communication mode is determined by notifying predetermined capability information on the terminal device.

2. Description of the Related Art

Widening bandwidths of networks and the increased prevalence of Internet appliances are beginning to create an environment in which communications such as two-way video telephony can be performed easily.

A technique using the Session Initiation Protocol (SIP) proposed as Request For Comments (RFC) 2543 is gradually becoming mainstream as a technique for initiating a two-way session such as Internet telephony.

The SIP is a protocol for handling call signaling and control in communication services based on the Internet Protocol (IP). The standardization of the SIP is being advanced by the Internet Engineering Task Force (IETF). Using the SIP makes it possible to initiate, alter and terminate two-way communications. The kinds of communications which can be dealt with by the SIP are not limited to communications via voice, but go so far as to encompass video communications, text based chat (communicating via text), interactive video communication games and virtual reality.

The SIP initiates and terminates a session, but is not concerned with the content of the session. Accordingly, as to the content of the session, the Session Description Protocol (SDP), which was proposed as RFC 2327, describes information on the session and media formats which can be used. Then, the SIP transmits the SDP describing such information to a communication partner as an INVITE message (a request to participate in the session), and initiates the session by way of a negotiation with the communication partner. In the context above, media format refers to, for example, formats such as the Joint Photographic Experts Group (JPEG) and Moving Picture Experts Group (MPEG), for example, where the medium is image data or the like.

SUMMARY OF THE INVENTION

However, due to the fact that the functions and categories of terminal devices that are capable of connecting to a network have become increasingly varied, there is a problem in that a method for selecting a mutually usable communications system is often tedious. Moreover, there is also a problem in that two-way communications cannot be performed between terminals with largely differing capabilities.

In conventional methods of initiating a session using the SIP, the party requesting to initiate a session (hereinafter referred to as a "caller") determines session information including media format. For example, the session information describes usable media formats, and the party receiving the request to initiate a session (hereinafter, referred to as a "callee") selects a suitable media format from among the ones proposed.

If there are differences in capabilities between the caller and the callee, for example, if there are differences in throughput or displaying capabilities, such problems as not being able to decode on one end data encoded on another end, or undersized displays on one end not being able to display video image which can be displayed on another end may arise.

The present invention is devised so that problems such as those mentioned above may be solved. The present invention provides a terminal device, a data transmission-reception system and a data transmission-reception initiating method, which make it possible to automatically set the optimum communication mode in accordance with the capabilities of the terminal device, and thereafter initiate a session.

In order to realize what is described above, a terminal device according to the present invention is a terminal device connected to an external device through a network, the terminal device comprising: data transmission means for transmitting predetermined data to the external device through the network; data reception means for receiving predetermined data transmitted from the external device through the network; session initiation request message generation means for generating a session initiation request message for initiating a session with the external device, the session initiation request message describing capability information on the terminal device in a predetermined format; session initiation request message transmission means for transmitting the session initiation request message generated by the session initiation request message generation means to the external device through the network; response message reception means for receiving a response message transmitted from the external device in response to the session initiation request message; capability information analyzing means for analyzing capability information on the external device, the capability information being described in a predetermined format in the response message received by the response message reception means; communication mode determination means for determining the communication mode between the terminal device and the external device through the network on the basis of an analysis result by the capability information analyzing means and the capability information on the terminal device; communication mode notification message transmission means for transmitting to the external device a communication mode notification message for notifying the communication mode determined by the communication mode determination means; and control means for controlling a data conversion device connected to the network on the basis of the communication mode determined by the communication mode determination means such that the data transmitted from the data transmission means is converted into data that can be received by the external device, and such that the data transmitted from the external device is converted into data which can be received by the data reception means.

Another terminal device according to the present invention is a terminal device connected to an external device through a network, the terminal device comprising: data reception means for receiving predetermined data transmitted from the external device through the network; data transmission means for transmitting predetermined data to the external device through the network; session initiation request message reception means for receiving a session initiation request message for initiating a session and which is transmitted from the external device, the session initiation message describing capability information on the external device in a predetermined format; capability information analyzing means for analyzing the capability information on the external device, the capability information being described in the session initiation request message received by the session initiation request message reception means; communication mode selection means for selecting at least one option of a communication mode between the external device and the terminal device through the network on the basis of an analysis result by the capability information analyzing means and capability information on the terminal device; response message generation means for generating a response message as a response to the session initiation request message, the response message describing the capability information on the terminal device in a predetermined format, where the capability information includes communication mode option information indicating the at least one option, mentioned above, of a communication mode selected by the communication mode selection means; response message transmission means for transmitting to the external device through the network the response message generated by the response message generation means; communication mode notification message reception means for receiving a communication mode notification message for notifying the communication mode determined by the external device; and control means for controlling a data conversion device, which is connected to the network, on the basis of the communication mode notification message received by the communication mode notification message reception means such that the data transmitted from the data transmission means is converted into data that can be received by the external device, and such that the data transmitted from the external device is converted into data which can be received by the data reception means.

A data transmission-reception system according to the present invention is a data transmission-reception system including a first terminal device provided with first data transmission-reception means, and a second terminal device provided with second data transmission-reception means, both of which are connected to a network. The first terminal device includes: session initiation request message generation means for generating a session initiation request message for initiating a session with the second terminal device, the session initiation request message describing capability information on the first terminal device in a predetermined format; session initiation request message transmission means for transmitting to the second terminal device through the network the session initiation request message generated by the session initiation request message generation means; response message reception means for receiving a response message transmitted from the second terminal device in response to the session initiation request message; first capability information analyzing means for analyzing capability information on the second terminal device, the capability information being described in a predetermined format in the response message received by the response message reception means; communication mode determination means for determining a communication mode between the first terminal device and the second terminal device through the network on the basis of an analysis result by the first capability information analyzing means and the capability information on the first terminal device; communication mode notification message transmission means for transmitting to the second terminal device a communication mode notification message for notifying the communication mode determined by the communication mode determination means; and first control means for controlling a first data conversion device, which is connected to the network, such that on the basis of the communication mode determined by the communication mode determination means, data transmitted from the first data transmission-reception means of the first terminal device is converted into data that can be received by the second terminal device, and data transmitted from the second data transmission-reception means of the second terminal device is converted into data that can be received by the first terminal device. The second terminal device includes: session initiation request message reception means for receiving the session initiation request message transmitted by the session initiation request message transmission means; second capability information analyzing means for analyzing capability information on the first terminal device described in the session initiation request message received by the session initiation request message reception means; communication mode selection means for selecting at least one option of a communication mode in the data transmission-reception system on the basis of an analysis result by the second capability information analyzing means and the capability information on the second terminal device; response message generation means for generating the response message in response to the session initiation request message, the response message describing in a predetermined format the capability information on the second terminal device, which includes communication mode option information indicating the at least one option, mentioned above, of a communication mode selected by the communication mode selection means; response message transmission means for transmitting to the first terminal device through the network the response message generated by the response message generation means; communication mode notification message reception means for receiving the communication mode notification message transmitted from the communication mode notification message transmission means of the first terminal device; and second control means for controlling a second data conversion device, which is connected to the network, on the basis of the communication mode notification message received by the communication mode notification message reception means such that data transmitted from the second data transmission-reception means of the second terminal device is converted into data that can be received by the first terminal device, and data transmitted from the first data transmission-reception means of the first terminal device is converted into data that can be received by the second terminal device.

A data transmission-reception initiation method according to the present invention is a data transmission-reception initiation method for a data transmission-reception system including a first terminal device provided with a first data transmission-reception means, and a second terminal device provided with a second data transmission-reception means, both of which are connected to a network. The data transmission-reception initiation method comprises: the first terminal device generating a session initiation request message for initiating a session with the second terminal device, the session initiation request message describing capability information on the first terminal device in a predetermined format; and transmitting to the second terminal device through the network the generated session initiation request message; the second terminal device receiving the session initiation request message transmitted from the first terminal device; analyzing the capability information on the first terminal device described in the received session initiation request message; selecting at least one option of a communication mode in the data transmission-reception system on the basis of an analysis result of the capability information on the first terminal device, and capability information on the second terminal device; generating a response message in response to the session initiation request message, the response message describing in a predetermined format the capability information on the second terminal device, which includes communication mode option information indicating the selected at least one option of a communication mode; and transmitting the generated response message to the first terminal device through the network; the first terminal device receiving the response message transmitted from the second terminal device; analyzing the capability information on the second terminal device described in the predetermined format in the received response message; determining a communication mode between the first terminal device and the second terminal device through the network on the basis of an analysis result of the capability information on the second terminal device and the capability information on the first terminal device; controlling a first data conversion device, which is connected to a network, on the basis of the determined communication mode such that data transmitted from the first data transmission-reception means of the first terminal device is converted into data that can be received by the second terminal device, and data transmitted from the second data transmission-reception means of the second terminal device is converted into data that can be received by the first terminal device; and transmitting a communication mode notification message notifying the determined communication mode to the second terminal device; the second terminal device receiving the communication mode notification message transmitted from the first terminal device; controlling a second data conversion device on the basis of the received communication mode notification message such that data transmitted from the second data transmission-reception means of the second terminal device is converted into data that can be received by the first terminal device, and data transmitted from the first data transmission-reception means of the first terminal device is converted into data that can be received by the second terminal device.

As will become apparent from the detailed description to follow, an embodiment of the terminal device according to the present invention makes it possible to automatically select the optimum communication mode taking differences in capabilities between the terminal device and the external device, network characteristics, and the capabilities of a data conversion device connected to the network into consideration.

Even if there is not a media format that is common to both the terminal device and the external device, it is possible to perform appropriate communications by controlling the first or second data conversion device, which is connected to the network, with the control means.

Moreover, even if there are a plurality of data conversion devices in the network, it is possible to determine the optimum conversion location (the optimum data conversion device), and, if need be, to use several data conversion devices at the same time.

Moreover, by using the SIP [RFC2543], it becomes possible to describe capability information on the terminal device and the external device in a session initiation request message as text information easily.

Moreover, as will become apparent from the detailed description to follow, an embodiment of a data transmission-reception system according to the present invention makes it possible to automatically select the optimum communication mode taking differences in capabilities between the terminal devices, network characteristics, and the capabilities of the first or second data conversion device connected to the network into account.

Even if the terminal devices in the system cannot handle a media format that is common to both of them, it is possible to perform appropriate communications by controlling the first or second data conversion device, which is connected to the network, with the control means.

In this system, even in cases where there exist a plurality of data conversion devices in the network, it is possible to determine the optimum conversion location (the optimum data conversion device), and, if need be, to use a plurality of data conversion devices at once.

Moreover, by using the SIP [RFC2543], it becomes possible to describe the capability information on each terminal device in a session initiation request message as text information easily.

As will become apparent from the detailed description to follow, an embodiment of a data transmission-reception initiation method according to the present invention makes it possible to automatically select the optimum communication mode taking differences in capabilities between the terminal devices, network characteristics, and capabilities of the first or second data conversion device.

In this method, even if the terminal devices cannot handle a media format that is common to both of them, it is possible to perform appropriate communications by controlling the first or second data conversion device connected to the network.

In this method, even in cases where there exist a plurality of data conversion devices in the network, it is possible to select the optimum conversion location (the optimum data conversion device), and, if need be, to use several data conversion devices at the same time.

BRIEF DESCRIPTION OF THE DRAWINGS

The invention disclosed herein will become better understood as a detailed description is made of the preferred embodiments with reference to the appended drawings in which:

FIG. 3 is shows an example of an SIP INVITE message transmitted from a caller terminal device in the data transmission-reception system;

FIG. 4 is a first timing chart illustrating operations at the time of initiating two-way communications in the same data transmission-reception system;

DESCRIPTION OF THE PREFERRED EMBODIMENTS

Hereinafter, preferred embodiments of a terminal device, a data transmission-reception system and a data transmission-reception initiation method according to the present invention will be described in detail with reference to the attached drawings.

Figure 1:
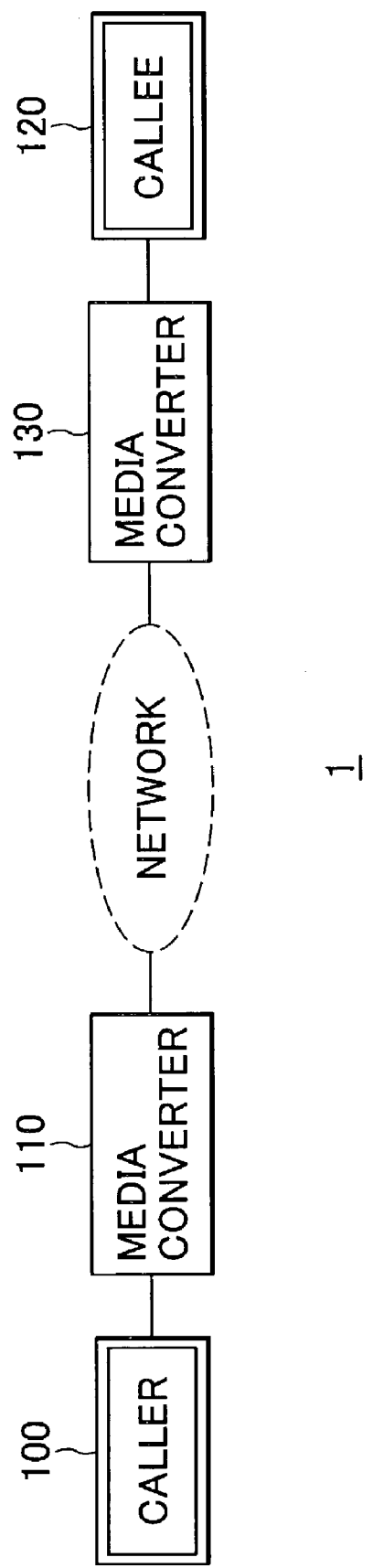
FIG. 1 is a diagram illustrating the configuration of a data transmission-reception system shown as an embodiment of the present invention.

The present invention is applied to a data transmission-reception system 1 shown in FIG. 1 as a schematic diagram.

In the data transmission-reception system 1, a caller 100, which is a terminal device that requests the initiation of a session, is connected to a callee 120, which is a terminal device on the receiving end and receives the session initiation request, via a network, such as the Internet.

Moreover, media converters 110 and 130 for converting media formats and which are under the control of the caller 100 and the callee 120, respectively, are connected to the caller 100 and the callee 120, respectively.

In practice, there can be various cases such as one where a media converter exists in each home and one where a media converter or a plurality of media converters exist in the network.

Next, details of the configurations of the caller 100, the callee 120 and the media converter 110 included in the data transmission-reception system 1 will be described with reference to FIG. 2.

Figure 2:
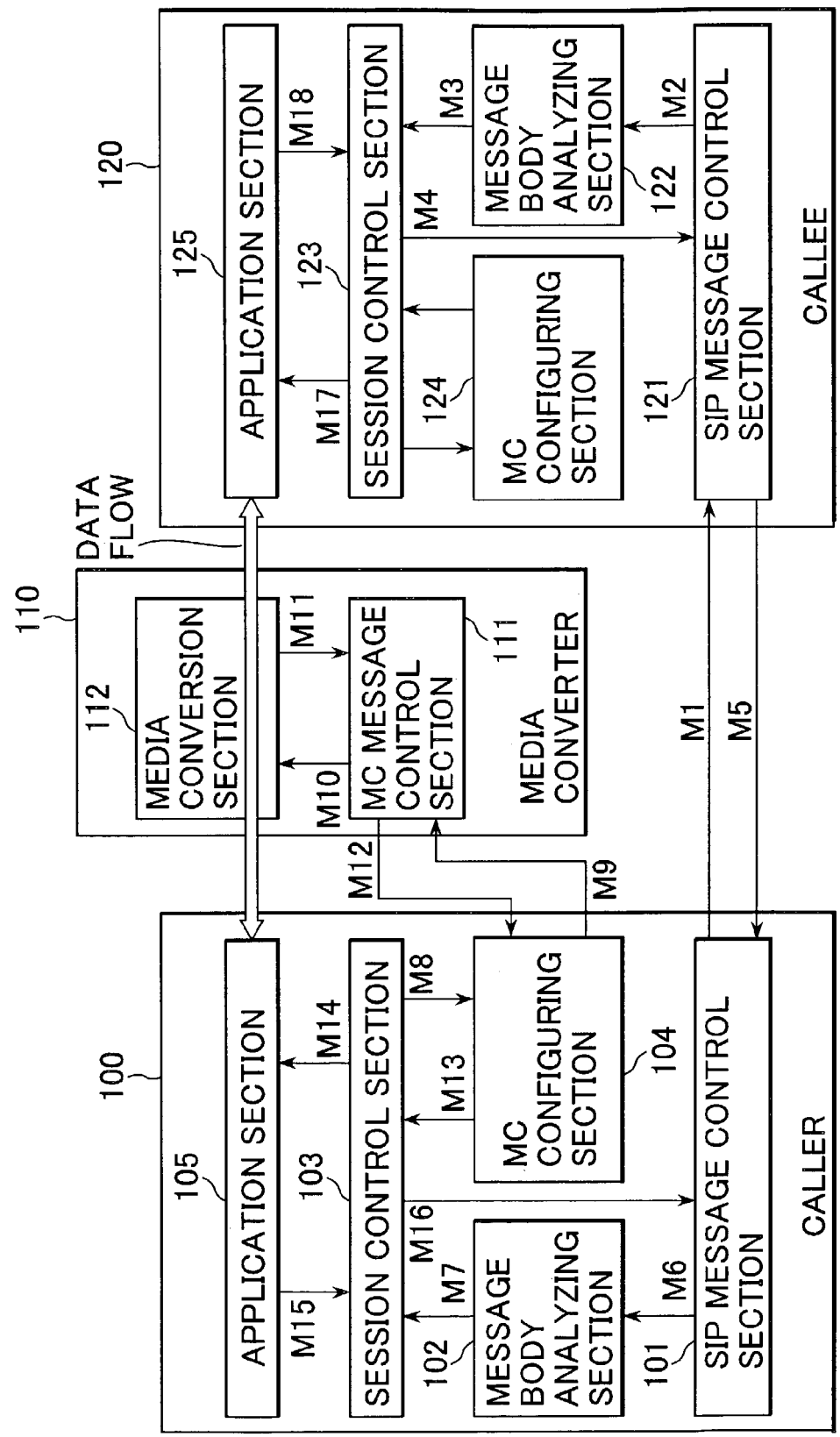
FIG. 2 is a block diagram illustrating each functional section of the devices constituting the data transmission-reception system.

Although the connections to the network are not shown in FIG. 2 for purposes of brevity, in practice, the data transmission-reception system 1 is configured such that the caller 100 and the callee 120 are connected via the network as shown in FIG. 1 described above. Also, in FIG. 2, only the media converter 110 under the control of the caller 100 is shown. The media converter 130 is omitted in this diagram for purposes of brevity since the media converter 130 has similar functions as those of the media converter 110 except in that the media converter 130 is under the control of the callee 120, and since a detailed description thereof would thus be redundant.

The caller 100 includes an SIP message control section 101, a message body analyzing section 102, a session control section 103, a media converter (MC) configuring section 104, and an application section 105.

The SIP message control section 101 generates an SIP INVITE message, and transmits the generated SIP INVITE message to the callee 120. In an SCL (Service Capability List) of a body section of the generated SIP INVITE message, the SIP message control section 101 describes the capability information on a terminal device, the caller 100 in this case, and the capability information on the media converter 110 under the control of the caller 100. It is necessary for the caller 100 to obtain in advance the capability information on the media converter 110 that is under the control of the caller 100.

The SCL is a region in which, for example, the capability information on a terminal device is described as mentioned above and which is newly defined in the body section of the SIP INVITE message. Consequently, session information is described in the SDP of the SIP INVITE message, and the capability information on the terminal device as well as the capability information on a data conversion device under the control of the terminal device and the like are described in the SCL.

FIG. 3 shows an example of the SIP INVITE message. The SIP INVITE message shown in FIG. 3 includes a header section of the SIP and an SCL section. The header section covers from "INVITE sip:isozu@sm.sony.co.jp SIP/2.0" to "Content-type :application/scl". The SCL section is written in Extensible Markup Language (XML) and begins with the tag <?xml version="1.0"?> and ends with the tag </xml>.

The capability information, which is written in XML in the SCL section, on the caller 100 and on the media converter 110 that is under the control of the caller 100 will be described next.

First, the name and the ID of the caller 100 are described in the tag <terminal name="VAIO-C1" id="3ffe:505:d:7000::1">.

Then, an application software name, such as "VisualPhone," is described in the tag <application name="VisualPhone">, and the port number to be used, "573," is described in the tag <port no="573">.

Next, information regarding media transmittable by the caller 100 is described in the tags <sendmedia type="video"> through </sendmedia>.

The media type transmittable from the caller 100, which in this example is "video signal," is described in the tag <sendmedia type="video">. The format of the transmittable media, which in this example is "bitmap," is described in the tag <format type="bitmap"/>. The number of colors in the transmittable media, which in this example is "16-bit," is described in the tag <color depth="16"/>. The resolution of the transmittable media, which in this example is "640×480," is described in the tag <resolution width="640" height="480"/>.

Information regarding the media type receivable by the caller 100 is described in the tags <recvmedia type="video"> through </recvmedia>.

The media type receivable by the caller 100, which in this case is "video signal," is described in the tag <recvmedia type="video">. The format of the receivable media, which in this example is "MPEG-2," is described in the tag <format type="MP2T"/>. The number of colors in the receivable media, which in this example is "24-bit," is described in the tag <color depth="24"/>. The resolution of the receivable media, which in this case is "320×160," is described in the tag <resolution width="320" height="160"/>.

The name and the ID of the media converter 110 are described in the tag <mediaconverter name="callers" id="3ffe:505:7100::1">. A conversion policy ID and a conversion type are described in the tag <convert id="1" type="size smaller">.

Information regarding media that can be inputted to the media converter 110 is described in the tags <inputmedia type="movie"> through </input media>. "Movie," which is the media type on the inputting end, is described in the tag <inputmedia type="movie">. "MPEG," which is the media format on the inputting end, is described in the tag <format type="mpeg">. "16bit," which is the number of colors in the medium on the inputting end, is described in the tag <color depth="16"/>. "640×480," which is the resolution of the medium on the inputting end, is described in the tag <resolution width="640" height="480"/>.

Moreover, information related to a medium which can be outputted from the media converter 110 is described in the tags <outputmedia type="movie"> through </outputmedia>.

"Movie," which is the media type on the outputting end, is described in the tag <output mediatype="movie">. "Bitmap," which is the media format on the outputting end, is described in the tag <format type="bitmap">. "8-bit," which is the number of colors in the medium on the outputting end, is described in the tag <color depth="8"/>. "320×160," which is the resolution of the medium on the outputting end, is described in the tag <resolution width="320" height="160"/>.

As described above, since the SIP has no rules regarding the contents of the sections other than the header section except that session information is to be described in the SDP, information such as the capability of a terminal device can be described freely as SCL in the SIP in text format, such as XML, as described above.

The message body analyzing section 102 analyzes the SCL described in the body section of an SIP OK message, which is a response message from the callee 120 in response to the SIP INVITE message, and inputs the analysis result to the session control section 103. For example, the message body analyzing section 102 may include an XML parser for analyzing a document written in XML, and when the SCL is written in XML, the message body analyzing section 102 invokes the XML parser to execute the analysis of the SCL.

Based on the content of the SCL of the SIP OK message analyzed by the message body analyzing section 102, the session control section 103 determines the communication mode using a predetermined evaluation function. The determining of the communication mode refers to, for example, the determining of the media format to be used, the determining of the media format conversion location, namely the determining of which media converter the media format is to be converted by, or the like.

The session control section 103 also controls the application section 105 to make the application section 105 configure predetermined application software.

Based on the communication mode determined by the session control section 103, if the media converter 110 needs to be configured, the MC configuring section 104 executes the configuring of the media converter 110 accordingly.

The application section 105 is capable of two-way data communications with an application section 125 of the callee 120 and stores application software which is activated in accordance with the control of the session control section 103 on the basis of the SIP OK message. The application section 105 stores, for example, application software for realizing two-way video telephony.

The callee 120 has a configuration substantially similar to the caller 100. The callee 120 includes an SIP message control section 121, a message body analyzing section 122, a session control section 123, an MC configuring section 124, and the application section 125.

The SIP message control section 121 receives the SIP INVITE message transmitted from the SIP message control section 101 of the caller 100, and inputs the received SIP INVITE message to the message body analyzing section 122.

The SIP message control section 121 generates an SIP OK message and transmits it to the SIP message control section 101 of the caller 100. Communication mode options, and the capability information on the caller 100 and the media converter 110 are described in the body section of the SIP OK message by the session control section 123, which will be described later.

The message body analyzing section 122 analyzes the SCL described in the body section of the SIP INVITE message, and inputs the analysis result to the session control section 123. For example, the message body analyzing section 122 includes an XML parser for analyzing documents written in XML, and if the SCL is written in XML, the XML parser is invoked and an analysis of the SCL is executed.

The session control section 123 selects a communication mode option, such as the media format, on the basis of the content of the SCL of the SIP INVITE message analyzed by the message body analyzing section 122.

Based on the communication mode determined by the session control section 103 of the caller 100, if a media converter 130 needs to be configured, the MC configuring section 124 executes the configuring of the media converter 130 accordingly.

The application section 125 is capable of two-way data communications with the application section 105 of the caller 100 and stores application software which is activated in accordance with the control of the session control section 123 based on the SIP INVITE message. The application section 125 stores, for example, application software for realizing two-way video telephony.

The media converter 110 includes an MC message control section 111 and a media conversion section 112.

In accordance with a request from the MC configuring section 104 of the caller 100, the MC message control section 111 configures the settings for media format conversion in the media conversion section 112. When the configuration is complete, the MC message control section 111 returns the result to the MC configuring section 104.

The media conversion section 112 performs a predetermined media format conversion in accordance with the control of the MC message control section 111. The media format conversion is, for example, a conversion from MPEG-2 to Motion JPEG.

Operations of the data transmission-reception system 1 in initiating two-way communications will be described using the timing charts shown in FIGS. 4 and 5.

Figure 5:
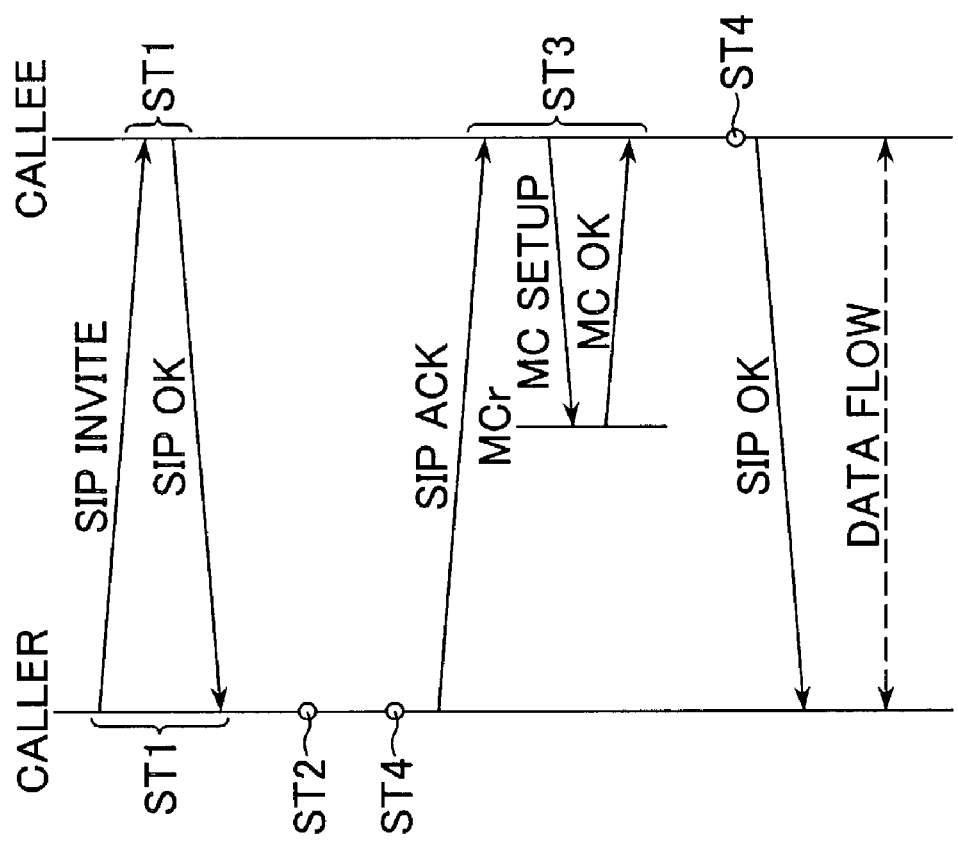
FIG. 5 is a second timing chart for illustrating operations at the time of initiating two-way communications in the same data transmission-reception system.

FIG. 4 is a timing chart illustrating a case where a media converter is configured as the media converter 110 on the side of the caller 100, and FIG. 5 is a timing chart illustrating a case where a media converter is configured as the media converter 130 on the side of the callee 120.

In Step ST1, the capability information on the caller 100 and the capability information on the media converter 110 are described in the body section of an SIP INVITE message, and the SIP INVITE message is transmitted to the callee 120.

In response, the callee 120 evaluates the content of the SIP INVITE message, and returns communication mode options to the caller 100.

Step ST1 may be described in further detail with reference to FIG. 2. The SIP message control section 101 of the caller 100 obtains the capability information on the caller 100 and the media converter 110. Then, the SIP message control section 101 describes the obtained capability information in the body section of the SIP INVITE message as the SCL, and transmits the SIP INVITE message to the callee 120 (M1).

The SIP message control section 121 of the callee 120 receives the transmitted SIP INVITE message, and inputs the received SIP INVITE message to the message body analyzing section 122 (M2).

If the SCL of the SIP invite message is written in, for example, XML, the message body analyzing section 122 analyzes the content of the SCL described in the body section with an XML parser. In this case, the information extracted by the XML parser includes, for example, media formats which can be processed by the caller 100, capability information on the media converter 110, the resolution with which video can be displayed, network interface and the like.

Once the session control section 123 of the callee 120 receives the information from the message body analyzing section 122 (M3), the session control section 123 selects at least one communication mode option for performing two-way communications between the caller 100 and the callee 120.

An example of an algorithm executed by the session control section 123 in order to determine the media format is described below, the media format being one example of the communication mode.

(1) If there is a media format that is common to and can be processed by both the caller 100 and the callee 120, that media format is used.

(2) If there is not a media format that can be handled in communications between the caller 100 and the callee 120 alone, it is examined whether or not there is a media format that can be handled through the media converter 110 or the media converter 130. If there is a media format that can be handled, given that it be via the media converter 110 or the media converter 130, that media format is used.

(3) If there is no media format that can be handled even if it is through the media converter 110 or the media converter 130, communications cannot be performed.

Figure 6:
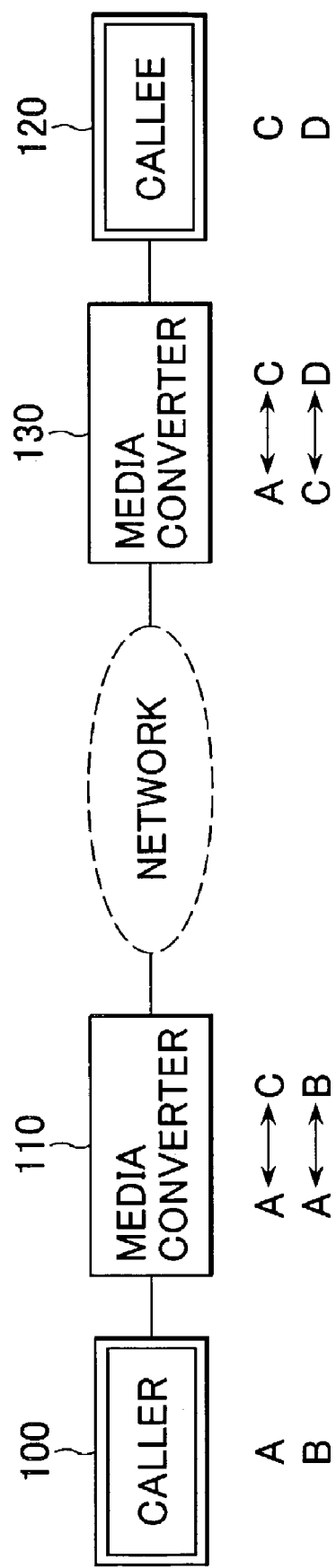
FIG. 6 is a diagram illustrating a technique for converting media formats in the same data transmission-reception system.

For example, as shown in FIG. 6, if it is assumed that the caller 100 can process media formats A and B, that the callee 120 can process media formats C and D, that the media converter 110 is capable of conversion between media formats A and B, as well as A and C; and that the media converter 130 is capable of conversion between media formats A and C, as well as C and D, then the information which the callee 120 inputs to the session control section 123 is information that "the caller 100 can process media formats A and B" and information that "the media converter 110 is capable of conversion between media formats A and C, as well as A and B."

In this case, there is no media format that is common to both the caller 100 and the callee 120. However, since it is possible to perform a conversion between media formats A and C through the media converter 110 or the media converter 130, the session control section 123 determines that, for example, the caller 100 will use media format A and that the callee 120 will use media format C.

In the example shown in FIG. 6, the session control section 123 of the callee 120 inputs, in XML format, to the SIP message control section 121 the fact that the callee 120 can process media formats C and D and that media format A can also be handled by means of the media converter 110 or the media converter 130 (M4).

The SIP message control section 121 of the callee 120 generates an SIP OK message, and describes the capability information on the callee 120 and the media converter 130 in the body section of the generated SIP OK message. Then, the SIP message control section 121 transmits the SIP OK message to the caller 100 (M5).

Next, in Step ST2, the optimum communication mode, such as the media formats between the caller 100 and the callee 120, is determined taking the capabilities of the caller 100 and the callee 120, as well as the media converter 110 or the media converter 130 into consideration.

Step ST2 may be described in further detail using FIG. 2. When the SIP message control section 101 of the caller 100 receives the SIP OK message from the callee 120, the SIP message control section 101 inputs the body section of the received SIP OK message to the message body analyzing section 102 (M6). The message body analyzing section 102 extracts information by way of an XML parser. The extracted information includes, for example, the capability information on the caller 100 and the callee 120, such as information concerning the media formats which the caller 100 and the callee 120 can process. Then, the message body analyzing section 102 inputs the extracted capability information to the session control section 103 (M7).

Based on the capability information on the caller 100, the callee 120, the media converter 110, and/or the media converter 130, and using a predetermined evaluation function, the session control section 103 determines the media format to be used and the media format conversion location indicating which media converter is used for media format conversion.

For example, if it is desirable that transmission and reception be performed in media format A and media format C in FIG. 6, media format conversion may be performed by the media converter 110 or the media converter 130. Taking network characteristics into consideration, the following evaluation functions may be considered.

In a case where media format A is highly compressed video data such as MPEG and media format C is uncompressed video data such as bitmap, in the stream from A to C, media format conversion is performed by the media converter 130 closer to the callee 120 in order to decrease network traffic.

In Step ST3, after the communication mode is determined in Step ST2, and communications are to be performed via the media converter 110 or the media converter 130, the caller 100 configures the media converter 110, and the callee 120 configures the media converter 130.

Step ST3 may be described in further detail using FIG. 2. When media format conversion is necessary, the caller 100 executes the configuring of a media converter.

The configuring of a media converter is executed by the terminal device that controls the respective media converter. For example, the configuring of the media converter 110 is executed by the caller 100 as shown in FIG. 4, and the configuring of the media converter 130 is executed by the callee 120 as shown in FIG. 5.

Below, a case where the media converter 110 is configured by the caller 100 will be described with reference to FIG. 2.

When it becomes necessary that the media converter 110 be configured, the session control section 103 of the caller 100 inputs to the MC configuring section 104 session information (the name and the content of a session, the IP addresses and the port numbers of the caller 100 and the callee 120, and the like), information regarding media format conversion (input format and output format), and the like (M8).

The MC configuring section 104 transmits an MC configuring message to the media converter 110 which is under the control of the caller 100 (MC9). There are two types of MC configuring messages as described below.

MC Setup Message

The MC setup message is a message for performing the configuring of a media converter. The following data are stored in the message.

IP address of the Media Converter
  input media format (before conversion)
  output media format (after conversion)
  IP address and port number of the data input side
  IP address and port number of the data output side MC ACK Message The MC ACK message is a response message to the MC setup message. When the configuring of the media converter 110 is successful, the media converter 110 returns an ID corresponding to the conversion policy. The ID becomes necessary in canceling the configuration. The following data are stored in the response message.

IP address of the terminal

ID corresponding to the conversion policy

When the MC message control section 111 of the media converter 110 receives the MC setup message, the MC message control section 111 inputs the received MC setup message to the media conversion section 112 (M10). Then, the media conversion section 112 performs the configuring of media format conversion. The media conversion section 112 notifies the MC message control section 111 of the completion of the configuring of media format conversion (M11).

Once the configuring of media format conversion is complete, the MC message control section 111 transmits the MC ACK message to the MC configuring section 104 of the caller 100 (M12). In response to receiving the MC ACK message, the MC configuring section 104 of the caller 100 returns the result of the configuring of the media format conversion by the media converter 110 to the session control section 103 (M13).

The timing of the configuring of the media converter is, for example, either the timing shown in FIG. 4 or FIG. 5 depending on which media converter is configured: the one on the caller 100 side or the one on the callee 120 side.

If the configuring is performed on the caller 100 side with respect to the media converter 110, the configuring is executed after Step ST2 is completed as shown in FIG. 4.

If the configuring is performed on the callee 120 side with respect to the media converter 130, the configuring is executed at the time of transmission of an SIP ACK after the configuring of an application on the caller 100 side is completed in step ST4, which will be described later, as shown in FIG. 5.

In step ST4, the caller 100 and the callee 120 configure applications. For example, two-way video telephone application software is configured.

The configuring of the application will be described below in further detail with reference to FIG. 2. Based on the information from the session control section 103, the caller 100 configures the application to enable the application to perform communications. The session control section 103 inputs session information to the application section 105 (M14). Then, once the configuration is complete, the session control section 103 receives the result thereof (M15).

Similarly, the callee 120 configures the application based on the information from the session control section 123 to enable communications. The session control section 123 inputs session information to the application section 125 (M17). Then, once the configuration is complete, the session control section 123 receives the result thereof (M18).

The timing for configuring the application is before transmission of the SIP ACK for the caller 100, and after reception of the SIP ACK for the callee 120.

When the configuration of the application by the caller 100 and the callee 120 is completed and the caller 100 receives the SIP OK message in response to the SIP ACK, a two-way session through the media converter(s) is initiated.

Thus, in the data transmission-reception system 1, the caller 100 describes the capability information on the caller 100 and the media converter 110 controlled by the caller 100 in the SIP INVITE message of the SIP (Session Initiation Protocol), and transmits the SIP INVITE message to the callee 120, who is a communication partner. In response to the SIP INVITE message, the caller 100 then receives the SIP OK message in which is described the capability information on the callee 120 and the media converter 130 controlled by the caller 100. Thus, it is possible to automatically select the optimum communication mode and to initiate a two-way session.

The data transmission-reception system 1 shown in FIG. 1 is an example of the simplest system configuration. In an actual two-way session initiation method using the SIP, however, there would be provided an SIP server. The SIP server has two modes. One is an SIP redirect mode in which the SIP server functions as a redirect server as shown in FIG. 7 and the other is an SIP proxy mode in which the SIP server functions as a proxy server as shown in FIG. 8.

Figure 7:
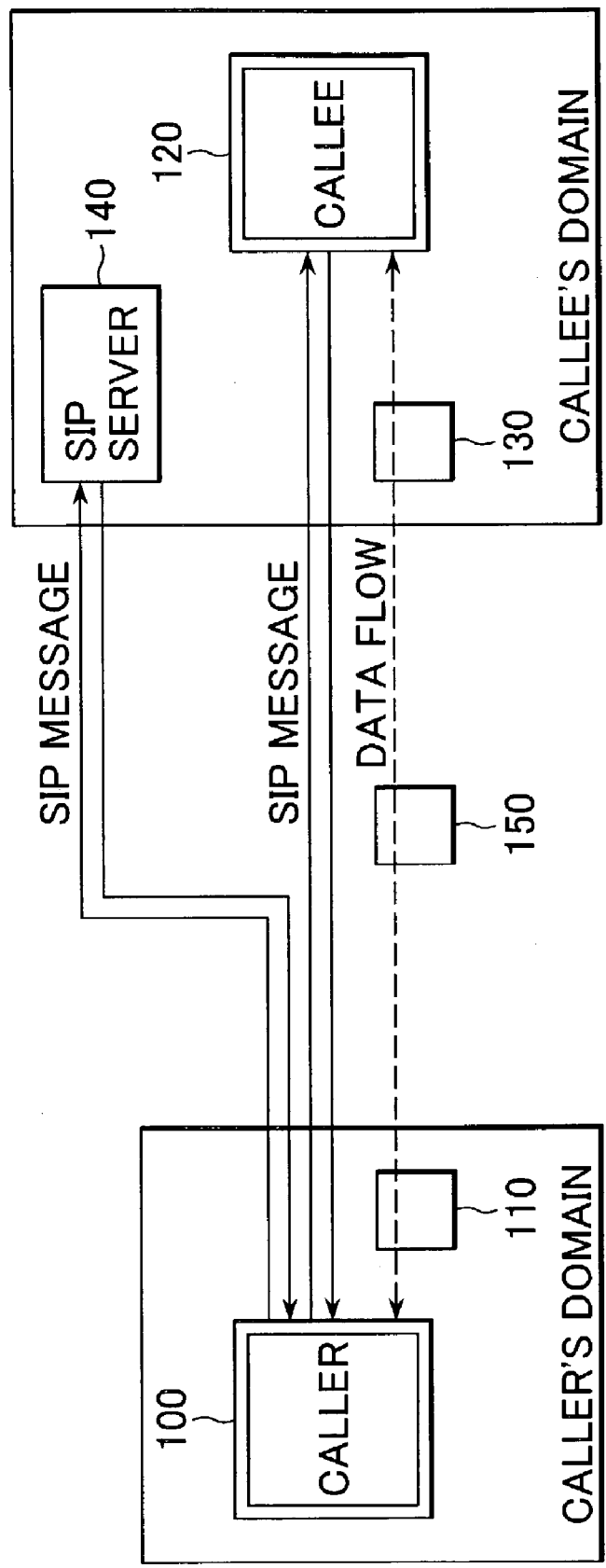
FIG. 7 is a diagram illustrating an SIP redirect mode in the same data transmission-reception system.

As shown in FIG. 7, in the SIP redirect mode, the caller 100 first transmits an SIP INVITE message to an SIP server 140. In response to the SIP INVITE message, the SIP server 140 determines where in the network the callee 120 is, and notifies the caller 100. In response to the notification of the location of the callee 120 in the network from the SIP server 140, the caller 100 exchanges SIP messages with the callee 120. Then, the caller 100 determines the optimum communication mode in the manner described above, and initiates a two-way session.

Figure 8:
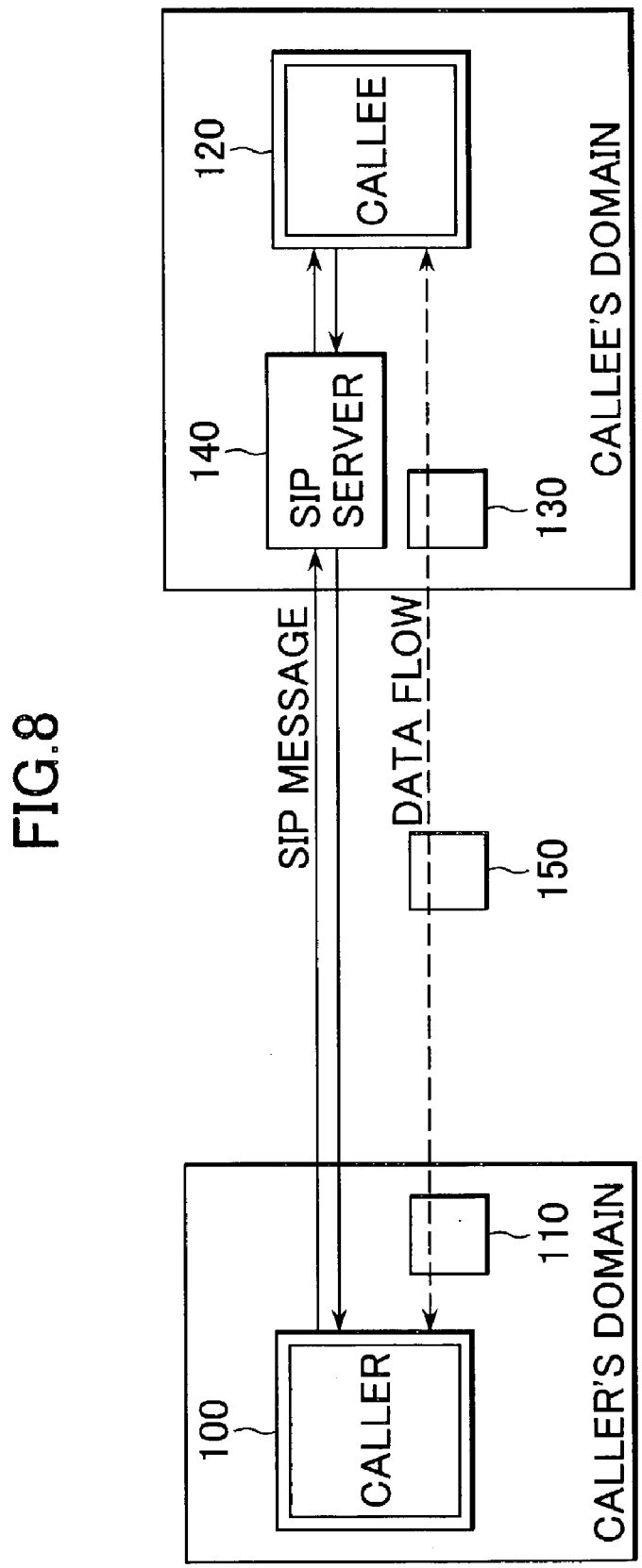
FIG. 8 is a diagram illustrating an SIP proxy mode in the same data transmission-reception system.

As shown in FIG. 8, in the SIP proxy mode, the caller 100 first transmits an SIP INVITE message to the SIP server 140. In response to the SIP INVITE message, the SIP server 140 accesses the callee 120 in place of the caller 100. From this point on, the caller 100 and the callee 120 exchange SIP messages via the SIP server 140. Then, the caller 100 and the callee 120 determine the optimum communication mode in the manner described above, and initiate a two-way session.

A media converter 150 is a media converter connected to the network, and which can be controlled by either of the caller 100 and the callee 120.

Figure 9:
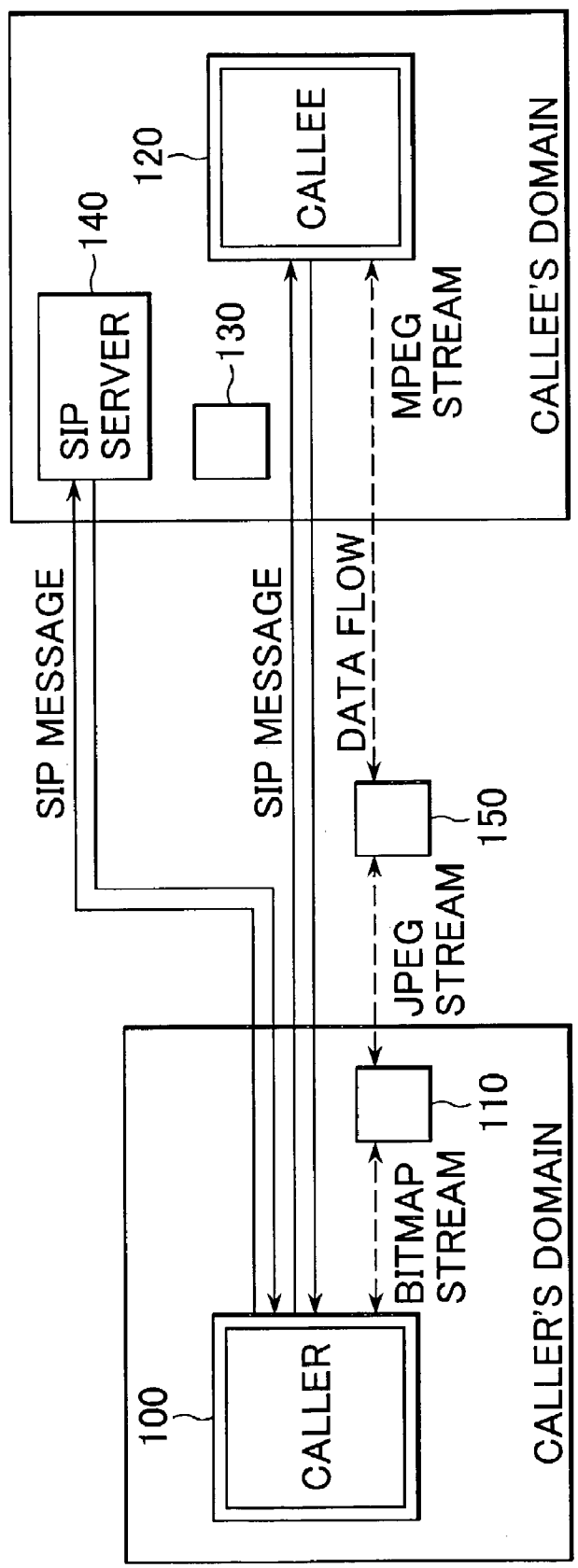
FIG. 9 is a diagram illustrating a specific example in the SIP redirect mode in the same data transmission-reception system.

With reference to FIG. 9, a data transmission-reception system 2 including the SIP server 140 operating, in this case, in the SIP redirect mode, the caller 100, which in this case is a portable terminal with inferior capabilities and which can only handle bitmap data, and the callee 120, which in this case is a high performance personal computer capable of transmitting data in MPEG, will now be described.

For example, it is assumed that the media converter 110 under the control of the caller 100 is a media converter capable of media format conversion between JPEG and bitmap, that the media converter 130 under the control of the callee 120 is a media converter capable of media format conversion between MPEG and Motion JPEG, and further, that the media converter 150 connected to the network is a media converter capable of media format conversion between MPEG and JPEG.

In order to convert MPEG data transmitted from the callee 120 into a media format receivable by the caller 100, the media converter 150 connected to the network and which can be controlled by either one of the caller 100 and the callee 120 first converts the MPEG data into JPEG data. Then, the JPEG data is converted into bitmap data by the media converter 110 controlled by the caller 100, thus realizing the conversion of MPEG data transmitted from the callee 120 into a media format receivable by the caller 100.

As in the example shown in FIG. 9, even in a case where the caller 100 is a portable terminal having low capabilities and the callee 120 is a high-performance personal computer, for example, users can execute two-way communications with ease.

Since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A terminal device connected to an external device through a network, said terminal device comprising:
   data transmission means for transmitting predetermined data to said external device through said network;
   data reception means for receiving predetermined data transmitted from said external device through said network;
   session initiation request message generation means for generating a session initiation request message for initiating a session with said external device, the session initiation request message including first capability information of said terminal device in a predetermined format;
   session initiation request message transmission means for transmitting said session initiation request message to said external device through said network;
   response message reception means for receiving, in response to said session initiation request message, a response message from said external device;
   capability information analyzing means for analyzing second capability information of said external device described in a predetermined format in said response message;
   communication mode determination means for determining a communication mode between said terminal device and said external device through said network based on an analysis result by said capability information analyzing means and based on said first capability information;
   communication mode notification message transmission means for transmitting to said external device a communication mode notification message, the communication notification message including said communication mode; and
   control means for controlling a data conversion device, which is connected to said network, based on said communication mode, such that said data conversion device converts said data transmitted from said data transmission means into data that can be received by said external device, and such that said data conversion device converts said data transmitted from said external device into data that can be received by said data reception means, wherein
   said first capability information includes media format information indicating a media format that can be used by said terminal device and includes media format convertibility information indicating a media format that can be converted by said data conversion device.

2. The terminal device according to claim 1, wherein said session initiation request message and said response message comply with the Session Initiation Protocol.

3. The terminal device according to claim 2, wherein said session initiation request message generation means of said terminal device describes said first capability information in said session initiation request message in text format.

4. The terminal device according to claim 1, wherein said data conversion device converts the media format of data.

5. The terminal device according to claim 1, wherein, based on network characteristics, said communication mode determination means determines whether to use said data conversion device controlled by said terminal device or to use a data conversion device controlled by said external device.

6. A terminal device connected to an external device through a network, said terminal device comprising:
   data reception means for receiving predetermined data transmitted from said external device through said network;
   data transmission means for transmitting predetermined data to said external device through said network;
   session initiation request message reception means for receiving a session initiation request message for initiating a session transmitted from said external device, the session initiation request message including first capability information of said external device in a predetermined format;
   capability information analyzing means for analyzing said first capability information;
   communication mode selection means for selecting a communication mode between said external device and said terminal device through said network based on an analysis result by said first capability information analyzing means and based on second capability information of said terminal device;
   response message generation means for generating, as a response to said session initiation request message, a response message in a predetermined format, said response message describing the selected communication mode;
   response message transmission means for transmitting said response message to said external device through said network;
   communication mode notification message reception means for receiving, from said external device, a communication mode notification message including said communication mode determined by said external device; and
   control means for controlling, based on said communication mode notification message, a data conversion device, which is connected to said network, such that said data conversion device converts data transmitted from said data transmission means to data that can be received by said external device, and such that said data conversion device converts data transmitted from said external device to data that can be received by said data reception means, wherein
   said second capability information on said terminal device includes second media format information indicating a media format that can be used by said terminal device, and second media format convertibility information indicating media formats that can be converted by said data conversion device.

7. The terminal device according to claim 6, wherein said session initiation request message and said response message comply with the Session Initiation Protocol.

8. The terminal device according to claim 7, wherein said response message generation means describes said response message in text format.

9. The terminal device according to claim 6, wherein said data conversion device converts the media format of data.

10. The terminal device according to claim 9, wherein
said first capability information on said external device includes first media format information indicating a media format that can be used by said external device, and first media format convertibility information indicating media formats that can be converted by said data conversion device,
and
said communication mode selection means selects the communication mode based on said first media format information, said first media format convertibility information, said second media format information, and said second media format convertibility information.

11. A data transmission-reception system including a first terminal device including a first data transmission-reception means, and a second terminal device including a second data transmission-reception means, the first terminal device and the second terminal device being connected to a network, wherein
said first terminal device comprises:
session initiation request message generation means for generating a session initiation request message for initiating a session with said second terminal device, the session initiation request message including first capability information of said first terminal device in a predetermined format;
session initiation request message transmission means for transmitting, to said second terminal device through said network, said session initiation request message;
response message reception means for receiving a response message from said second terminal device in response to said session initiation request message;
first capability information analyzing means for analyzing the response message, the response message including second capability information of said second terminal device described in a predetermined format;
communication mode determination means for determining a communication mode between said first terminal device and said second terminal device through said network based on an analysis result by said first capability information analyzing means and based on said first capability information;
communication mode notification message transmission means for transmitting to said second terminal device a communication mode notification message including said communication mode; and
first control means for controlling, based on said communication mode, a first data conversion device that is connected to said network, such that said first data conversion device converts data transmitted from said first terminal device into data that can be received by said second terminal device, and such that said first data conversion device converts data transmitted from said second terminal device to said first data transmission-reception means into data that can be received by said first terminal device, and
said second terminal device comprises:
session initiation request message reception means for receiving said session initiation request message;
second capability information analyzing means for analyzing said first capability information of said first terminal device, the first capability information being described in said session initiation request message;
communication mode selection means for selecting a communication mode in said data transmission-reception system based on an analysis result by said second capability information analyzing means and based on said second capability information;
response message generation means for generating, as a response to said session initiation request message, said response message including said second capability information and including communication mode option information indicating said communication mode;
response message transmission means for transmitting said response message to said first terminal device through said network;
communication mode notification message reception means for receiving said communication mode notification message transmitted from said first terminal device; and
second control means for controlling, based on said communication mode notification message received by said communication mode notification message reception means, a second data conversion device that is connected to said network, such that said second data conversion device converts data transmitted from said second terminal device into data that can be received by said first terminal device, and such that said second data conversion device converts data transmitted from said first terminal device into data that can be received by said second terminal device, wherein
said second capability information includes second media format information indicating a media format that can be used by said second terminal device, and second media format convertibility information indicating a media format that can be converted by said second data conversion device.

12. The data transmission-reception system according to claim 11, wherein said session initiation request message and said response message comply with the Session Initiation Protocol.

13. The data transmission-reception system according to claim 12, wherein:
said session initiation request message generation means of said first terminal device describes in text format said first capability information in said session initiation request message; and
said response message generation means of said second terminal device describes in text format said second capability information in said response message.

14. The data transmission-reception system according to claim 11, wherein said data conversion devices connected to said network convert the media format of data.

15. The data transmission-reception system according to claim 14, wherein
said first capability information on said first terminal device includes first media format information indicating a media format that can be used by said first terminal device, and includes first media format convertibility information indicating a media format that can be converted by said first data conversion device, and
said communication mode selection means of said second terminal device selects said communication mode based on said first media format information, said first media format convertibility information, said second media format information, and said second media format convertibility information.

16. The data transmission-reception system according to claim 11, wherein said communication mode determination means of said first terminal device determines, based on network characteristics, whether to use said first data conversion device, and whether to use said second data conversion device.

17. A data transmission-reception initiation method for a data transmission-reception system including a first terminal device provided with a first data transmission-reception means connected to a network, and including a second terminal device provided with a second data transmission-reception means connected to said network, said method comprising:

generating a session initiation request message, at said first terminal device, for initiating a session with said second terminal device, the session initiation request message including first capability information of said first terminal device using a predetermined format;

transmitting said generated session initiation request message from said first terminal device to said second terminal device through said network;

receiving said session initiation request message transmitted from said first terminal device at said second terminal device;

analyzing, at said second terminal device, said first capability information;

selecting, at said second terminal device, a communication mode in said data transmission-reception system based on an analysis result of said first capability information, and based on second capability information of said second terminal device;

generating, at said second terminal device as a response to said session initiation request message, a response message in which said second capability, including communication mode information indicating said selected communication mode, is described in a predetermined format;

transmitting said generated response message from said second terminal device to said first terminal device through said network;

receiving said response message transmitted from said second terminal device at said first terminal device;

analyzing, at said first terminal device, said second capability information on said terminal device described in said received response message;

determining, at said first terminal device, a communication mode between said first terminal device and said second terminal device through said network based on an analysis result of said second capability information and on said first capability information;

controlling, at said first terminal device, a first data conversion device that is connected to said network, such that said first data conversion device converts data transmitted from said first terminal device into data that can be received by said second terminal device, and such that said first data conversion device converts data transmitted from said second terminal device into data that can be received by said first terminal device;

transmitting from said first terminal device to said second terminal device a communication mode notification message including said determined communication mode;

receiving said communication mode notification message transmitted from said first terminal device at said second terminal device; and based on said received communication mode notification message, controlling, at said second terminal device, a second data conversion device that is connected to said network, such that said second data conversion device converts data transmitted from said second terminal device into data that can be received by said first terminal device, and such that said second data conversion device converts data transmitted from said first terminal device into data that can be received by said second terminal device, wherein said first capability information includes media format information indicating a media format that can be used by said first terminal device, and media format convertibility information indicating a media format that can be converted by said first data conversion device.

* * * * *